United States Patent [19]

Clegg

[11] Patent Number: 4,610,713
[45] Date of Patent: Sep. 9, 1986

[54] SETTLE BLOW HEAD AND BAFFLE ARM ATTACHMENT FOR GLASSWARE MOLDING MACHINE

[76] Inventor: Wallace H. Clegg, P.O. Box 113, East Killingly, Conn. 06243

[21] Appl. No.: 685,849

[22] Filed: Dec. 24, 1984

[51] Int. Cl.⁴ .............................................. C03B 9/00
[52] U.S. Cl. ......................................... 65/300; 65/307
[58] Field of Search .................. 65/261, 300, 307; 425/535

[56] References Cited

U.S. PATENT DOCUMENTS

| | | | |
|---|---|---|---|
| 3,189,427 | 6/1965 | Schirm | 65/307 |
| 3,472,642 | 10/1969 | Irwin | 65/232 |
| 3,561,941 | 2/1971 | Dahms | 65/232 |
| 4,261,724 | 4/1981 | Sarkozy | 65/261 |
| 4,466,821 | 8/1984 | Irwin et al. | 65/261 |

Primary Examiner—S. Leon Bashore
Assistant Examiner—Michael K. Boyer
Attorney, Agent, or Firm—Barlow & Barlow

[57] ABSTRACT

A carrier arm for a glass blowing machine employing two or more holders with removable heads. The heads fit into the holders by the utilization of a bayonet fitting, and a retainer ring is provided that encircles the holders and maintains the heads in locked position in the holders without exerting any lateral forces on the heads.

1 Claim, 6 Drawing Figures

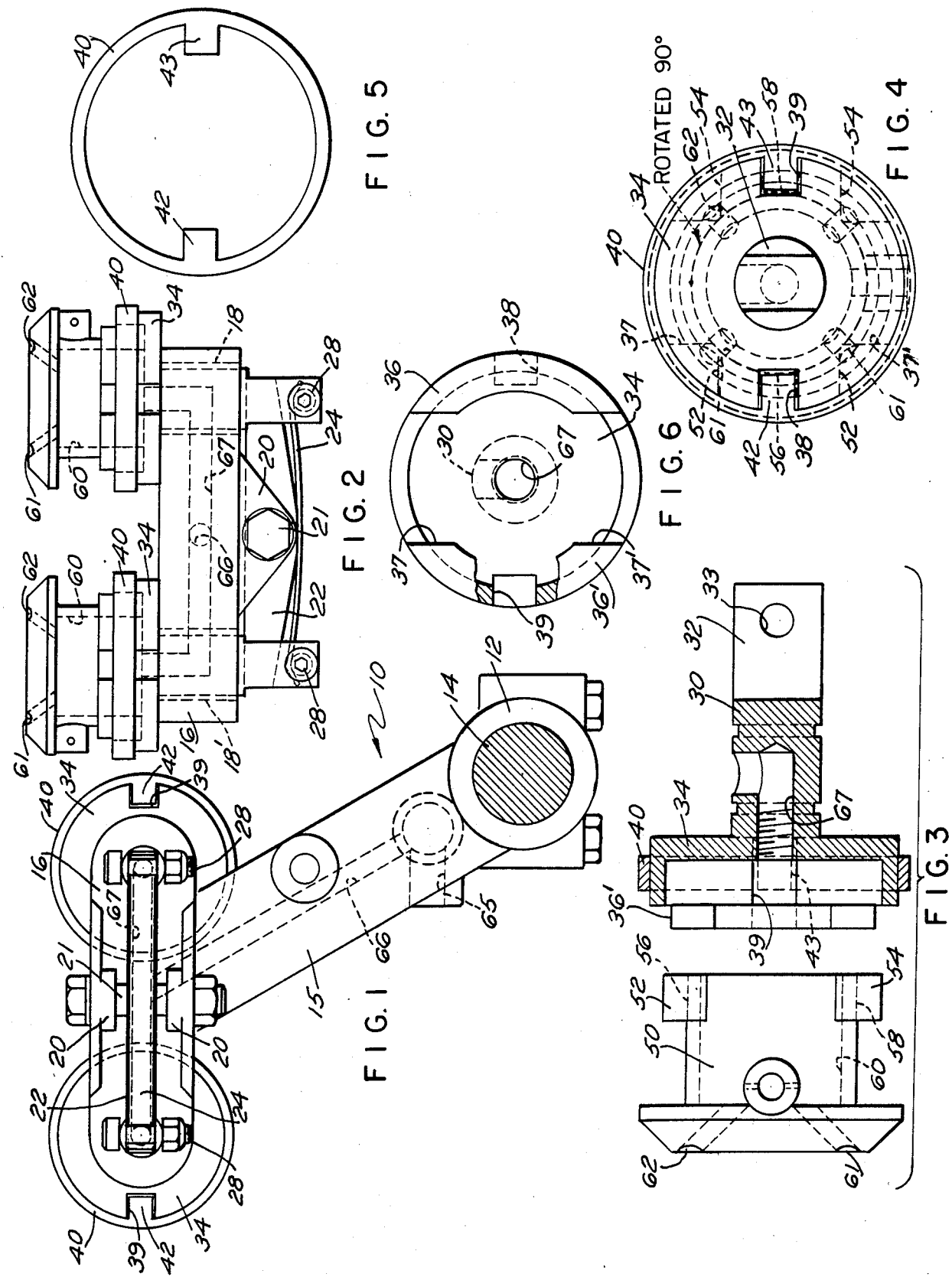

SETTLE BLOW HEAD AND BAFFLE ARM ATTACHMENT FOR GLASSWARE MOLDING MACHINE

BACKGROUND OF THE INVENTION

Individual section glassware forming machines, such as are shown for example in U.S. Pat. No. 1,911,119, dated May 23, 1933, comprise a plurality of sections arranged side by side. A baffle is provided on a suitable carrier arm and is generally lowered into position on top of a funnel through which the glass gob is initially deposited into the blank mold. Similarly, a blow head that is of almost identical form is used for final blowing. Each section is essentially a forming device for converting the molten glob of glass into a shaped article of glass ware. The carrier arm, for example, in its operation may be lowered into position directly against the blank mold, and in so doing must be able to rock to a certain finite amount so as to make proper engagement with the mold.

In the past it has been conventional to hold the blow head or baffle in position by means of spring loaded levers which pass through slots in a retainer ring and directly engage the upper end of the blow head. This type of arrangement, as seen in the Dahms U.S. Pat. No. 3,561,941, exerts a sidewise pressure on the blow head or baffle. The result of the sidewise pressure over an extended period of time tends to wear the bushing in the carrier arm through which the baffle and blow head holders pass, which is a result of the reacting forces, for examples, of the blow head striking the mold, rocking against the spring pressure of the lever, which in turn places a reactive force on the bushing.

To reduce this condition, the attempts in the prior art that have been made, of which I am aware, include the use of a pin that engages one side of the holder through the slot thereof that in turn will engage the groove in the blow head and prevent rotation thereof, and another attempt as seen in the Irwin U.S. Pat. No. 3,472,642, where the blow head is fitted with a protruberance to prevent rotation thereof, the protruberance engaging an arm with a fork at the outer end thereof.

SUMMARY OF THE INVENTION

The principal object of the invention is to provide a blow head or baffle retainer construction that will allow equalized seating of the blow head or baffle on the mold and reduce wear.

In keeping with the invention, there will be provided a glassware forming machine, which will have a carrier arm attached to a vertically disposed actuating rod, the arm having a plurality of holders mounted therein with blow heads or baffles releasably secured in the holders by means of a bayonet fitting arrangement. The holders are provided with a pair of diametrically located slots, and encircling the holders is a ring with inwardly directed protruberances thereon which engage the slots. When a blow head or baffle having protruberances and grooves within the protruberances is inserted into the bayonet structure and rotated so that the grooves align with the slots, and protruberances on the ring may be dropped into place to prevent the blow head or baffle from further rotation and yet allow freedom of rocking movement so that the bayonet fixture will hold the blow head or baffle in place.

BRIEF DESCRIPTION OF THE DRAWINGS

FIG. 1 is a plan view of a typical blow head or baffle carrier arm with the baffle and retaining ring of this invention;

FIG. 2 is a side elevational view thereof illustrated upside down;

FIG. 3 is a detached elevational view, partly in section, of a holder and a blow head made in accordance with the invention;

FIG. 4 is a top view of a holder and blow head or baffle in assembled relationship;

FIG. 5 is a plan view of the locking ring; and

FIG. 6 is a bottom view of the holder partly in section.

DETAILED DESCRIPTION OF THE PREFERRED EMBODIMENT

Referring to FIG. 1 where a utilitarian example of the present invention is exemplified, a carrier arm generally designated 10 consists essentially of cylindrical portion 12 mounted on a vertical shaft 14, which as recognized by those skilled in the art, has a reciprocating and rotary motion. The arm portion 15 extends from the cylindrical portion 12 outwardly to an elongated member 16 that has a plurality of bushings 18, 18' (FIG. 2) vertically bored therein. These bushings 18 are aligned so that their axial centers are spaced the same as the spacing between the axial centers of the underlying mold cavities on which the carrier arm operates. In the elongated portion 15, a pair of ears 20 are provided, and these ears secure with a pin 21, a plate 22 which passes into the slotted upper end 32 of the holders (FIG. 3). A leaf spring 24 is provided on the upper surface of the plate 22 which engages pin 28 in the upper part of the holder so as to provide equalization between the two holders.

The baffle or blow head holders themselves, seen best in FIG. 3, essentially consists of an upper post or shaft-like end 30 with a slotted portion 32 just referred to that has a bore 33 through which the pin 28 may pass. The lower end of the holder defines a bayonet socket portion 34 which has a pair of inwardly directed lips 36, 36' at the lower edge thereof. Through the wall of the socket and the lips there are formed diametrically located slots 38, 39. Surrounding the periphery of the holder 34 is a retainer ring 40 which as seen in FIG. 5 is provided with a pair of inwardly directed bosses 42, 43.

The blow head or baffle is of somewhat conventional construction and is adapted to engage the bayonet fitting of the baffle holders essentially made up of the lips 36, 36' and the openings 37, 37', therebetween in the lower end of the holder. To this end the blow head, which may be referred to as a baffle depending on its location in the machine, 50 is fitted at the upper end with diametral bosses 52, 54 which have a groove 56, 58 respectively cut therein. The blow head or baffle is also provided with a central cavity having inner walls 60 and bores 61 and 62 that open out to the lower end thereof.

As will be seen by referring to FIG. 4, the blow head or baffle is simply inserted into the bayonet socket fitting of the holder with the opposed bosses passing through openings 37, 37, and the head is then rotated 90° so as to line up the grooves 56, 58 with the slots 38, 39. Once aligned, the locking ring may be dropped into place and the protruberances 42, 43 will loosely engage in the grooves 56, 58 of the blow head or baffle. In this fashion, the blow head or baffle is prevented from rotating, but no sidewise forces are exerted on the blow head and the same is free to rock within the holder and align with the mold.

As will be understood by those skilled in the art, when the assembly is in use, air under pressure for shaping glass is supplied to the arm through a necessary port and passageways 65, 66 which connect with a passage 67 in the post of the holder. Air is then directed down and into the interior of the blow head or baffle from whence it can exit through bores 61, 62 so that air may be introduced to the mold cavity.

I claim:

1. In a glass blowing machine having a carrier arm attached to an actuating shaft a plurality of holders mounted in said arm, each holder having a bayonet fitting at the lower end thereof and a pair of diametral slots in the periphery of the bayonet fitting, a retainer ring having inwardly directed diametral protruberances circumferentially spaced to engage said slots, each blow head-baffle construction having an upper end with diametral bosses that have a groove therein, the bosses loosely engaging the holder fitting whereby the grooves may align with the slots when the construction is rotated and the protruberances may engage in the grooves and loosely engage said grooves to secure the construction from dislodgment yet permit rocking of the blowhead baffle in the holder.

* * * * *